United States Patent [19]
Mehta et al.

[11] Patent Number: 6,143,120
[45] Date of Patent: Nov. 7, 2000

[54] CELLULOSE SUBSTRATES WITH TRANSPARENTIZED AREA AND METHOD OF MAKING

[75] Inventors: Rajendra Mehta; Hugh B. Skees, both of Dayton, Ohio

[73] Assignee: The Standard Register Company, Dayton, Ohio

[21] Appl. No.: 09/104,589

[22] Filed: Jun. 25, 1998

[51] Int. Cl.[7] .................................................. B32B 31/00
[52] U.S. Cl. ............................ 156/272.2; 156/272.6; 156/274.4; 156/275.5; 156/278; 428/412; 428/481; 428/195
[58] Field of Search ................................ 428/481, 522, 428/412, 520, 409, 521, 195; 427/53, 54, 161, 595; 156/272.2, 272.6, 274.4, 275.5, 278

[56] References Cited

U.S. PATENT DOCUMENTS

| | | |
|---|---|---|
| 2,760,863 | 8/1956 | Plambeck, Jr. . |
| 3,043,805 | 7/1962 | Burg . |
| 3,261,686 | 7/1966 | Celeste et al. . |
| 3,380,831 | 4/1968 | Cohen et al. . |
| 3,469,982 | 9/1969 | Celeste . |
| 3,661,576 | 5/1972 | Crary . |
| 3,813,261 | 5/1974 | Muller . |
| 4,128,437 | 12/1978 | Ura et al. ............................. 106/287 |
| 4,198,465 | 4/1980 | Moore et al. . |
| 4,237,185 | 12/1980 | Lombardi et al. . |
| 4,271,227 | 6/1981 | Muller et al. . |
| 4,319,009 | 3/1982 | Friedli et al. . |
| 4,362,848 | 12/1982 | Friedli et al. . |
| 4,416,950 | 11/1983 | Muller et al. . |
| 4,513,056 | 4/1985 | Vernois et al. . |
| 4,526,803 | 7/1985 | White . |
| 4,569,888 | 2/1986 | Muller et al. . |
| 4,729,506 | 3/1988 | Neubauer . |
| 4,761,435 | 8/1988 | Murphy et al. . |
| 4,814,043 | 3/1989 | Rausing et al. . |
| 5,055,354 | 10/1991 | Simcoke . |
| 5,207,871 | 5/1993 | Murphy et al. . |
| 5,416,126 | 5/1995 | Murphy et al. . |
| 5,418,205 | 5/1995 | Mehta et al. . |
| 5,663,264 | 9/1997 | Kawai et al. . |

*Primary Examiner*—Merrick Dixon
*Attorney, Agent, or Firm*—Killworth, Gottman, Hagan & Schaeff, L.L.P.

[57] ABSTRACT

A cellulosic substrate which is suitable for use as a mailer or envelope and which has at least one transparentized portion is provided. A method of transparentizing a cellulosic substrate by the application of a transparentizing material which provides enhanced toner adhesion properties, fast penetration rates and which is cured by exposure to radiation is also provided. The addition of small amounts of water to the transparentizing material enhances penetration rates. Further, these transparentizing materials may be applied without the need for solvents. These features thus permit continuous, in-line transparentization.

23 Claims, 3 Drawing Sheets

CELLULOSE SUBSTRATES WITH TRANSPARENTIZED AREA AND METHOD OF MAKING

FIELD OF THE INVENTION

The present invention relates to a cellulosic substrate, and method of making it, suitable for use as an envelope or mailer, and more particularly, to one having at least one transparentized portion.

BACKGROUND OF THE INVENTION

As is known, various types of envelopes or mailers with transparent windows exist where the window consists of a cut-out opening in the mailer substrate which is covered by a transparent patch. The transparent patch is usually secured over the cut-out opening by means of an adhesive, and may consist of any suitable film of transparent material such as glassine, cellophane, or polymeric materials including polyester, polyethylene, polycarbonate, polystyrene, and polyethylene terephthalate. The adhesive is generally applied to the mailer substrate around the perimeter of the cut-out opening to join the outer perimeter of the transparent patch thereto. The transparent patch can be secured to either the inside or outside surface of the mailer substrate.

In some modern mailing systems, a mailer is formed from a single sheet after it has been imaged by a non-impact printer. These sheets are stacked in the input hopper and fed as single plies through the printer, after which the sheets are folded to form a mailer. A window is provided to permit the name and address to show through. Added thickness caused by such window patches over die-cut window openings causes mis-shapen stacks and prevents trouble-free feeding.

The typical arrangement of such patches is disadvantageous as the transparent patch is layered on top of or below the substrate, the thickness of the window portion of the sheet is greater than that of the remainder of the sheet. As a consequence, such sheets form unstable and uneven stacks, and thus limit the maximum height to which they can be stacked. This stack-height limitation is burdensome to large scale printing operations.

Another disadvantage with mailers having a cut-out opening covered by a transparent patch is that the edges of the transparent patch often get caught by process machinery, such as sheet transport mechanisms in printers. This results in the destruction of the mailer and usually requires the machinery to be stopped so that the destroyed mailer can be removed. Moreover, when heat is employed in such process machinery, the adhesive holding the transparent patch to the mailer substrate can soften, causing the patch to become detached from the mailer substrate.

One alternative to the cut-out/transparent patch type of arrangement is to apply a transparentizing material to a predetermined portion of the cellulosic mailer substrate to thereby form a window. See, for example, U.S. Pat. No. 5,418,205 to Mehta. Such a method entails the impregnation of the cellulosic mailer substrate with transparentizing material. The spaces between the fibers of the substrate are filled by the transparentizing material. In order to make the impregnaged portion transparent, the transparentizing material must have a refractive index close to that of cellulose (1.5).

In order to produce high quality cellulosic mailers on a large, industrial scale by employing a transparentizing material, it is desirable that the transparentizing material be capable of achieving at least three important functions:

1) the ability to produce a transparentized portion which possesses a number of physical and chemical properties;
2) the ability to be converted quickly from a penetrating liquid to a solid after impregnation has occurred; and
3) the ability to quickly penetrate the cellulosic mailer substrate in order to fully impregnate the substrate in the shortest time possible. The drawback to producing mailers in this manner, however, is that most transparentizing materials can perform, at most, only one of the aforementioned functions.

Physically, the transparentized portion of a cellulosic mailer substrate should be physically strong and flexible (i.e., not brittle) and be receptive to inks. Chemically, the transparentizied portion should meet U.S. Postal Service specifications for reflectance (sufficient transparency to read the printing beneath the transparentized portion) and PCR ("Print Contrast Ratio"-sufficient contrast between the printing and background beneath the transparentized portion) and should have sufficient resistance to migration and/or volatilization of the transparentizing material from the place where applied on the mailer substrate such that it does not lose its transparency over time.

Conventional transparentizing materials are not capable of producing transparentized window portions which possess all of the aforementioned physical and chemical properties. U.S. Pat. No. 5,076,489 to Steidinger, for example, discloses using either wax or oil as the transparentizing material. Wax produces a brittle transparentized area which is easily marred by physical contact therewith to cause a loss of transparency. In addition, wax is not receptive to inks and therefore cannot be printed upon. Oil tends to migrate and/or volatilize easily, thus resulting in a loss of transparency over time.

In an attempt to overcome these problems, certain liquid polymerizable transparentizing compositions have been utilized. When utilizing polymerizable transparentizing compositions, the paper substrate is first rendered transparent by impregnating it with the liquid polymerizable transparentizing composition. The liquid polymerizable transparentizing composition is then cured in situ to solidify the transparentized portion. These polymerizable transparentizing compositions offer several advantages over conventional transparentizing materials, such as wax and oil, in that the end-product is usually strong and flexible and does not lose it transparency over time due to migration or/or volatilization. However, there are problems associated with the use of these polymerizable transparentizing compositions. For example, the rate at which some of the liquid polymerizable transparentizing compositions penetrate a cellulosic substrate is so slow that, after applying the transparentizing composition to the substrate, the substrate must be wound up in a tight roll for a period of time to allow the material to impregnate the substrate. See for example, U.S. Pat. No. 4,416,950 to Muller et al. Such materials are not conducive to the high-speed production of mailers having transparentized windows. In an attempt to overcome the slow rate of penetration associated with known polymerizable transparentizing compositions, solvents have been included with the polymerizable transparentizing composition to lower the viscosity thereof and thereby speed the rate of penetration of the transparentizing composition into the cellulosic mailer substrate (see, e.g., U.S. Pat. No. 4,513,056 to Vemois et al). However, the use of solvents with transparentizing materials is undesirable due to the added process machinery required to evaporate the solvent from the substrate surface and to recover the evaporated solvent. It is also known to include water or water-alcohol mixtures with the transparentizing material to increase their wetting capabilities and thus increase the rate of penetration into a cellulosic substrate. See, for example, U.S. Pat. No. 3,813,261 to Muller et al. However, the use of water with transparentizing material is typically not considered conducive to high-speed production due to the time associated with removing the water from the cellulosic substrate surface. In addition, most transparentizing agents are non-polar and are not soluble in water. Therefore, they form emulsions which are not suitable for uniform distribution of the transparentizing material onto the cellulosic substrate.

In addition, since most polymerizable transparentizing agents are non polar, they exhibit limited toner adhesion properties, making it difficult to use high speed laser printers to image the transparentized areas on the mailers. This limits the amount of transparentizing material which can be loaded onto the cellulosic substrate and therefore, limits the degree of transparency in the final transparentized cellulosic product.

Further, although many of these polymerizable transparentizing compositions are thermally cured, radiation curing is preferable for reasons of both accuracy and economy. Radiation-curable, solventless liquid paper transparentizing compositions are known, but suffer from one or more of the above-mentioned problems. For example, U.S. Pat. No. 5,418,205 discloses a solventless liquid transparentizing material which quickly penetrates the cellulosic substrate and results in a high quality transparentized portion which is strong and flexible and which does not lose transparency over time. However, the transparentizing material is non-polar. Therefore, it is insoluble in water and its wetting capabilities cannot be increased by the addition of water due to the formation of emulsions. In addition, since the transparentizing material is non-polar, it exhibits limited toner adhesion properties. Therefore, the degree of transparency in the final product is limited.

In addition, many polymerizable transparentizing compositions suffer from incomplete and/or slow crosslinking reactions. Incomplete cross-linking results in a product in which unreacted monomer or oligomer remains in the cured transparentized layer. Unreacted monomer or oligomer in the cured transparentized layer may result in tackiness. Uncured or partially cured transparentized layers which are tacky present various problems, such as blocking (i.e., when two or more forms or transparentized window areas join together and result in problematic printer feeding) and material transfer of uncured constituents to fuser rollers. In addition, unreacted monomer or oligomer in the cured transparentized layer may result in degradation of opacity of the transparentized area.

Other problems associated with polymerizable, 100% solids transparentizing compositions are odor and skin irritation on contact.

Accordingly, it is seen that a need exists in the art for a substrate suitable for use as a mailer or envelope having at least one transparentized portion which can be placed in tall, stable stacks and which does not have equipment-catching edges around the window area. Further, the transparentized portion should be capable of being produced at a rate of speed conducive to high-speed production of mailers without the need for solvents. In addition, the liquid polymerizable transparentizing compositions should exhibit good toner adhesion properties. Also, they should be amenable to curing by radiation rather than by thermal polymerization.

SUMMARY OF THE INVENTION

Those needs are met by the present invention. Thus, the present invention provides a cellulosic substrate, and method of making it, which has at least one transparentized portion and preferably, wherein a smooth interface exists between the transparentized portion and the remainder of the substrate. In addition, the transparentized portion preferably has a thickness which is no greater than the thickness of the remainder of the substrate. Thus, no machine-catching edges are present, and mailers made from the substrate will form tall, stable stacks due to the ability to form transparent windows without adding thickness to the substrate. Moreover, the present invention also provides a solventless transparentizing material which penetrates the mailer substrate very quickly and completely, and forms a cured polymeric transparentized portion which not only possesses the aforementioned physical and chemical properties, but also exhibits an improved degree of transparency. In this manner, a very high-quality transparentized portion can be formed on cellulosic mailer substrates in a fast, continuous, in-line process, without the need for recovering a solvent. In this manner, a very high-quality transparentized portion can be formed on cellulosic mailer substrates in a fast, continuous, in-line process, without the need for recovering a solvent. Further, the present invention provides a liquid polymerizable transparentizing composition which exhibits good toner adhesion properties and is cured by radiation rather than by thermal polymerization.

The present invention provides a cellulosic substrate suitable for use as an envelope or mailer. The cellulosic substrate has at least one transparentized portion which comprises an area on the substrate which has been impregnated with a polymerized transparentizing material. In certain embodiments, the transparentized portion is thinner than the remainder of the substrate. Preferably, the transparentized portion has a smooth interface between itself and the remainder of the substrate, and the transparentized portion has a thickness which is no greater than the thickness of the remainder of the substrate. "Smooth interface" means one in which no loose or sharp edges are present which could get caught in process equipment and cause jams or tears. "Transparentized" means that there is sufficient transparency to read printing beneath the transparentized portion of the substrate (reflectance of at least 50% in the red spectrum and at least 45% in the green spectrum), and sufficient contrast between the printing and background portion beneath the transparentized portion to provide a print contrast ratio of at least 30%.

The radiation curable transparentizing composition of the present invention comprises at least one monomer selected from the group consisting of acrylate or methacrylate esters of polyhydroxy polyethers made from polyhydric alcohols (polyols) starting materials (compounds of Formula I) and/or acrylate or methacrylate esters of polyhydroxy polyethers made from primary or secondary amine starting materials (compounds of Formula II).

The novel feature of the invention is the use in transparentizing formulations of acrylate and/or methacrylate esters of hydroxy polyethers made by reaction of ethylene and/or propylene oxide with organic compounds having one or more reactive sites, such reactive sites comprising hydroxyl and primary or secondary amine groups. These acrylate/methacrylate esters may be represented by the following:

I wherein
R" is any mono- or polyfunctional organic radical;
R is H or CH$_3$;
R' is H or —C(O)C(R)═CH$_2$, with the proviso that —C(O)C(R)═CH$_2$ occurs at least once;
x is an integer 0–4 and indicates the number of functional groups on R" which are reactive with ethylene or propylene oxide;
z is an integer 1–4 and may vary independently of x and n;
n is an integer 1–20 and is independent of x and z; and wherein if any of R, R', or R" are greater than one, their identities and the number of each may be the same or different; and

II wherein
R" is any mono- or polyfunctional organic radical;
R is H or CH$_3$;
R' is H or —C(O)C(R)═CH$_2$, with the proviso that —C(O)C(R)═CH$_2$ occurs at least once;
x is an integer 0–4 and indicates the number of functional groups on R" which are reactive with ethylene or propylene oxide;
z is an integer 1–4 and may vary independently of x and n;
n is an integer 1–20 and is independent of x and z; and
R'" is H or a group of the formula:

wherein R, R', and n are as defined as above,
wherein if any of R, R', R" or R'" are greater than one, their identities and the number of each may be the same or different.

These agents may be used alone, that is, as individual compounds selected from either Formula I or Formula II. Alternatively, these agents may be used as mixtures of compounds of Formula I, mixtures of compounds of Formula II, or as mixtures of compounds of Formula I and compounds of Formula II. As used hereinafter, the term "transparentizing material" or "transparentizing composition" refers to a composition which includes a compound or compounds of Formula I and/or Formula II.

The compounds of Formula I and Formula II are an improvement over known transparentizing agents in that incorporation of the repeating ethylene oxide units renders the them hydrophilic (water-loving) and polar. Due to the increased polarity of these compounds, they exhibit enhanced toner adhesion properties, thus allowing more transparentizing material to be loaded onto the cellulosic substrate. The ability to load more transparentizing material onto the paper substrate is highly desirable in that there is a direct relationship between the amount of transparentizing material loaded on the paper and the degree of transparency achieved in the final product. In addition, radiation curing of the transparentizing material is preferred in that it is faster and more reliable than other forms of curing such as, for example, heat curing. These features thus permit continuous, in-line transparentization. Another advantage of the above-recited transparenting material is that penetration is achieved without the need for solvents. Thus, the transparentizing material is applied can be a 100% solid composition, thus eliminating the need for evaporation and recovery of solvent from the substrate.

In the preferred embodiment, the transparentizing material further includes a small amount of water. Generally, the amount of water used in this embodiment constitutes between about 1% to about 15% of the total transparentizing formulation. Unlike most transparentizing agents which are non-polar and therefore not soluble in water, the compounds of Formula I and Formula II form miscible mixtures with small amounts of water. The resulting miscible formulation exhibits increased wetting capabilities and, resulting in an increased speed of penetration into the paper substrate and allowing for faster line-speeds. This increased speed of penetration is sufficiently high that faster line-speeds are obtained even taking into account the time necessary to remove the water prior to radiation curing.

A further advantage of the use of the above-recited polymerizable transparentizing compositions is that the transparentized portion produced by the coating is a high quality one. Physically, the transparentized portion is strong and flexible and is highly receptive to inks and/or toner. One advantage of such good receptivity to inks and/or toner is that it allows a reverse image to be printed on the lower surface of the transparentized portion. In this manner, the reverse image is printed on the lower surface of the transparentized portion. In this manner, the reverse image is visible as a normal image through the upper surface of the transparentized portion.

Chemically, the transparentized portion of the present invention meets U.S. Postal Service specifications for reflectance and PCR. This is believed possible due to the fact that the transparentizing material penetrates the substrate substantially completely. Additionally, the resulting transparentized portion has sufficient resistance to migration and/or volatilization of the radiation cured material that it does not lose its transparency over time. While not wishing to be bound by any specific theory, this advantage is believed due to the fact that the transparentizing material is applied is 100% solids and the fact that the transparentizing material can be radiation cured almost immediately after it has been applied to the substrate since it penetrates the substrate so quickly.

Although the radiation curable transparentizing materials of the present invention penetrate the fastest when used without oligomers or prepolymers, there may be occasions when the need for specific physical and/or chemical properties in the transparentized portion outweigh the need for high speed penetration. In such circumstances, oligomers and/or prepolymers may be included in the coating. For example, it may be desirable to include one or more prepolymers in the transparentizing material if, due to the nature of the cellulosic substrate, for instance, it were necessary to adjust the refractive index of the transparentizing material in order to ensure that the cured transparentizing material has a refractive index close to that of the cellulosic substrate. The preferred prepolymers for this purpose are selected from the group consisting of styrene-maleic anhydride prepolymer, styrene-acrylic acid prepolymer, and styrene-methacrylic acid prepolymer. Similarly, it may also be necessary in certain situations to have a transparenized portion with extra flexibility. In such situations, an oligomer may be included in the transparentizing material. The preferred oligomers are styrene-acrylic acid oligomers and urethane acrylate oligomers. Whether or not a prepolymer and/or oligomer is included in the transparentizing material, however, it is preferable that the transparentizing material have a refractive index of about 1.5 after the transparentizing material has been cured. Further, the transparentized portion of the substrate preferably has a thickness in the range of from about 0.0005 to about 0.002 inches (i.e., about $1.27 \times 10^{-3}$ cm to about $5.08 \times 10^{-3}$ cm).

In addition, the radiation curable transparentizing material may include other monomers, such as vinyl ethers and/or acrylate or methacrylate esters of polyhydric alcohols which contain 4 or more acrylate or methacrylate functionalities. Vinyl ethers may be added to the transparentizing material to eliminate odor and to lower the viscosity of the formulation, thereby allowing even faster penetration into the cellulosic substrate. Acrylate or methacrylate esters of polyhydric alcohols which contain 4 or more acrylate or methacrylate functionalities may be added to the transparentizing material to increase the cross-linking density, to lower the viscosity, and to generally increase the rate of curing of the transparentizing material.

In addition to the foregoing, the present invention provides a method of transparentizing a predetermined portion or portions of a cellulosic substrate, preferably such that a smooth interface exists between the transparentized portion and the remainder of the substrate, and preferably such that the transparentized portion has a thickness which is no greater than the thickness of the remainder of the substrate. In some embodiments, the method comprises making a predetermined portion of the substrate thinner than the remainder of the substrate such that the predetermined portion is rendered substantially transparent, and applying a transparentizing material to the predetermined portion. In other embodiments, the method comprises heating the transparentizing material prior to application to the predetermined portion of the substrate, heating the predetermined portion of the substrate prior to application of the transparentizing material, or heating both the transparentizing material and the predetermined portion of the substrate prior to application of the transparentizing material.

As mentioned, the speed at which the above-recited transparentizing material penetrates allows transparentizing to occur in a continuous, in-line process. Such a process may be a continuous flexographic printing process, gravure, or roll-metering process, with flexographic being preferred, in which the step of applying the transparentizing material to the predetermined portion occurs in the continuous printing process. The polymerizable transparentizing compositions of the present invention have a viscosity which makes them suitable as "inks" to be applied by printing techniques. The transparentizing material is then cured immediately thereafter as a subsequent step in the continuous process. Preferably, those steps occur at a speed of about 75 to about 1000 linear feet (i.e., about 22.86 linear meters to about 304.8 linear meters) of substrate per minute.

To provide even faster penetration of the transparentizing material into the substrate, the step of applying the transparentizing material to the predetermined portion can occur simultaneously to both the upper and lower surfaced of the predetermined portion.

In the embodiment wherein the predetermined portion of the substrate is made thinner than the remainder of the substrate, this thinning may be accomplished by removing a portion of the thickness therefrom. The removal is preferably accomplished by mechanically grinding the portion. Preferably, the predetermined portion has a thickness ranging from about 0.0005 inches to about 0.002 inches (i.e., about $1.27 \times 10^{-3}$ cm to about $5.08 \times 10^{-3}$ cm) following the grinding operation. Alternatively, the predetermined portion can be made thinner by compressing, such as by calendaring the predetermined portion to a predetermined thickness. Preferably, such predetermined thickness ranges from about 0.0005 inches to about 0.002 inches (i.e., about $1.27 \times 10^{-3}$ cm to about $5.08 \times 10^{-3}$ cm) following the compression of the predetermined portion.

Accordingly, it is a feature of the present invention to provide a cellulosic substrate which is suitable for use as a mailer or envelope and which has at least one transparentized portion. It is further a feature of the present invention to provide a method of transparentizing a cellulosic substrate by the application of a transparentizing material which contains transparentizing agents which are hydrophilic (water-loving) and polar and therefore provide enhanced toner adhesion properties and fast penetration rates. In addition, these transparentizing agents do not form emulsions upon the addition of small amounts of water, and the transparentizing agents which contain small amounts of water exhibit even faster penetration rates. Further, these transparentizing materials may be applied without the need for solvents. Moreover, the present invention also provides a solventless transparentizing material which penetrates the mailer substrate very quickly and completely, and forms a cured polymeric transparentized portion which not only possesses the aforementioned physical and chemical properties, but also exhibits an improved degree of transparency. In this manner, a very high-quality transparentized portion can be formed on cellulosic mailer substrates in a fast, continuous, in-line process, without the need for recovering a solvent. Further the present invention provides liquid polymerizable transparentizing compositions which exhibit good toner adhesion properties and are cured by radiation rather than by thermal polymerization. These features thus permit continuous, in-line transparentization. These features thus permit continuous, in-line transparentization.

DETAILED DESCRIPTION OF THE INVENTION

Figure 1:
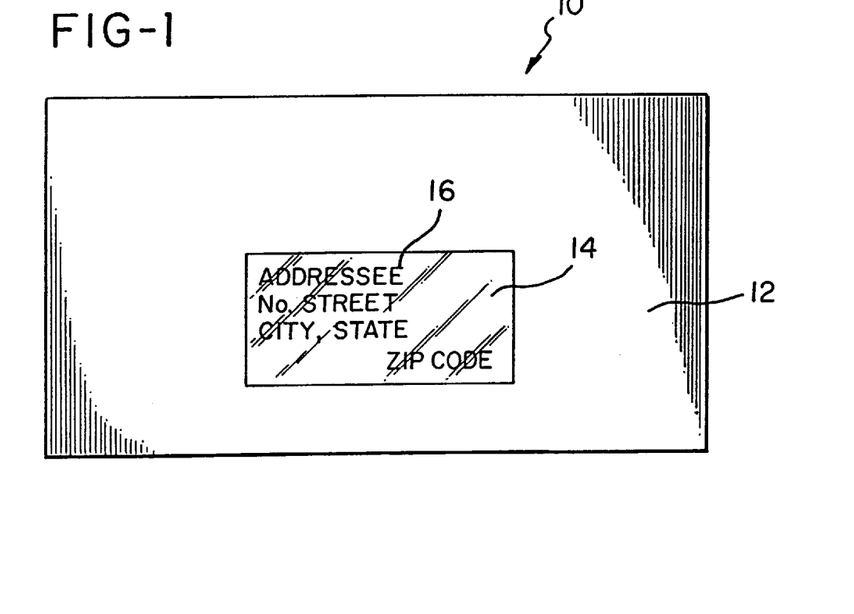
FIG. 1 is a front elevational view of a mailer having a transparentized portion showing addressee information.

Referring now to FIG. 1, a mailer or envelope 10 is formed from the cellulosic substrate 12 of the present invention. Substrate 12 includes a transparentized portion 14. Transparentized portion 14 allows the addressee information 16, on the inside of mailer 10, to be viewed from the outside of mailer 10. Examples of addressee information 16 on the inside of mailer 10 include 1) printing on a separate insert; 2) printing the rear inside surface of the mailer 10; or 3) printing on the rear inside surface of the transparentized portion 14. Mailer 10 can be any type of mailer or envelope. For example, mailer 10 could be an inter-office mailer or one which is mailed through the U.S. Postal Service. In addition, mailer 10 could be designed to accept a facsimile transmission sheet directly from a facsimile transmission device in order to keep information contained within the facsimile transmission sheet confidential, except for addressee information.

Figure 2:
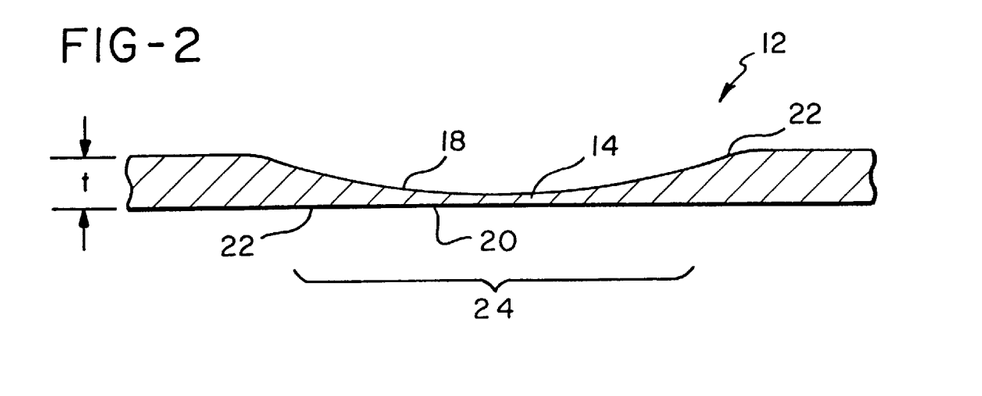
FIG. 2 is a cross-sectional view of the cellulosic substrate after the predetermined portion has been thinned by grinding or compression.
Figure 3:
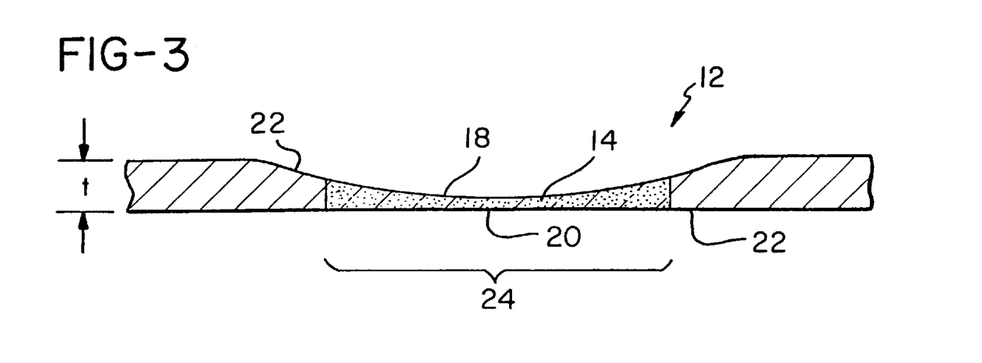
FIG. 3 is a cross-sectional view of the cellulosic substrate after the thinned portion has been impregnated with a transparentizing material.

Referring now generally to FIGS. 2 and 3, the features of the cellulosic substrate of the present invention which utilizes a thinning of the substrate 12 will be described, where like reference numerals refer to like features. Transparentized portion 14 of substrate 12 has an upper surface 18 and a lower surface 20. When substrate 12 is used to form a mailer, upper surface 18 will be on the outside of the mailer, while lower surface 20 will be in the inside of the mailer. Transparentized portion 14 preferably has a smooth interface 22 between:

1) the upper surface 18 and the lower surface 20 of the transparentized portion 14 and
2) the remainder of substrate 12.

In this manner no loose or sharp edges are present on the substrate to get caught in printers or other process machinery.

In addition, in FIGS. 2 and 3, transparentized portion 14 has a thickness which is less than the thickness "t" of the remainder of the substrate. As a consequence, transparentized portion 14 does not increase the thickness of substrate 12. Thus, numerous ones of mailers or envelopes formed from substrate 12 can be placed into tall, stable stacks. As mentioned, such tall stackes are more convenient than short stacks and facilitate manufacturing and printing operations.

Referring now to FIG. 2, transparentized portion 14 of substrate 12 comprises an area 24 of substrate 12 which is sufficiently thinner than the remainder of the substrate 12. Area 24 can be any predetermined portion of substrate 12 whereat it is desired to place a transparentized portion.

Area 24 may be made thinner than the remainder of substrate 12 by removing a section of the thickness therefrom or by compressing it. It is preferred that transparentized portion 14 have a thickness ranging from about 0.0005 inches to about 0.002 inches (i.e., about $1.27 \times 10^{-3}$ cm to about $5.08 \times 10^{-3}$ cm) following the removal or of compression of the section from area 24. Although FIG. 2 shows the reduction in thickness as having been performed on the upper surface 18 of transparentized portion 14, it can also be performed to the lower surface 20, or to both surfaces. In addition, although FIG. 2 shows a reduction of the thickness of area 24 by removal of a section of the thickness therefrom or compression wherein there is a gradual sloping to area 24, one of ordinary skill in the art will readily realize that such compression or removal of thickness of area 24 may also be done such that there is a more abrupt sloping to area 24 (not shown).

In one embodiment, thinning of area 24 is accomplished by mechanically grinding away the section. A preferred means of grinding away the section of area 24 is by passing substrate 12 between a large roll and a smaller, grinding roll. Raised projections of the desired size and shape of the transparentized portion 14 are placed upon the large roll. In this manner, substrate 12 will be ground away by the grinding roll in the shape of the raised projection. Such grinding equipment is readily available commercially. An example of a suitable grinding apparatus is illustrated in U.S. Pat. No. 4,814,043 to Rausing et al., the disclosure of which is incorporated by herein by reference. It is preferred that the shape of the raised projections allow small holes to be formed in transparentized portion 14. The preferred hole size is 0.10 mm or larger.

Area 24 can also be made thinner than the remainder of substrate 12 by compressing substrate 12 at area 24 to a predetermined thickness. Preferably, such predetermined thickness ranges from about 0.0005 inches to about 0.002 inches (i.e., about $1.27 \times 10^{-3}$ cm to about $5.08 \times 10^{-3}$ cm) following the compression of substrate 12 at area 24. More preferably, the predetermined thickness is 0.002 inch or less (i.e., about $5.08 \times 10^{-3}$ cm or less). The preferred technique for compressing substrate 12 at area 24 is by calendaring substrate 12, using calendaring equipment, but only at area 24. In this manner, area 24 will be thinner, and have a higher density, than the remainder of substrate 12. Compression in selected area may be accomplished by a pair of rotating cylinders, one of which has raised areas on its surface corresponding to areas to be compressed.

Figure 4:
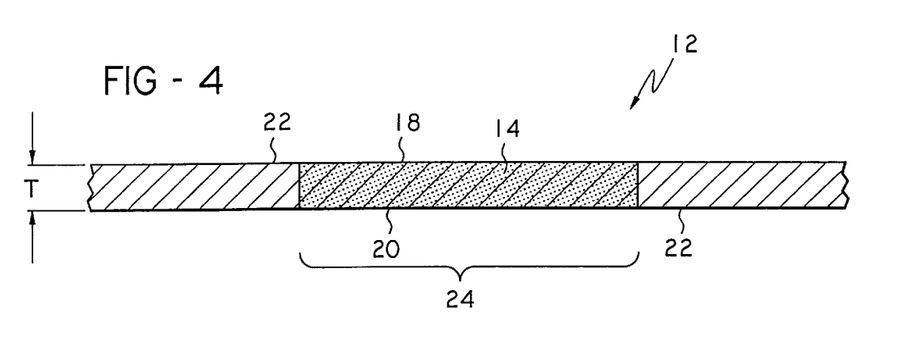
FIG. 4 is a cross-section view of the cellulosic substrate which has been impregnated with a transparentizing material without any thinning of the substrate.

FIG. 4 depicts the embodiment wherein no thinning of area 24 is required to result in the transparentized portion 14 which does not increase the thickness of substrate 12. This may be accomplished by either heating area 24 by the application of localized heat which is 50° C. to about 100° C. for about 1 to about 2 minutes prior to the application of the transparentizing material to area 24, heating the transparentizing material to a temperature of about 30° C. to about 50° C. prior to application to area 24, or heating area 24 by the application of localized heat which is 50° C. to about 100° C. for about 1 to about 2 minutes and also heating the transparentizing material to a temperature of about 30° C. to about 50° C. prior to application to heated-area 24.

As shown in FIG. 3 and FIG. 4, a portion 14 of substrate 12 is then impregnated with a radiation curable transparentizing material of the present invention. Portion 14 can be any predetermined portion of substrate 12 where it is desired to place a transparentized portion. The transparentizing agents of the present invention typically constitute 75–95% by weight and preferably 80–90% by weight of the final transparentizing material. These agents are acrylate and/or methacrylate esters of hydroxy polyethers made by reaction of ethylene and/or propylene oxide with organic compounds having one or more reactive sites, such reactive sites comprising hydroxyl and primary or secondary amine groups. These acrylate/methacrylate esters may be represented by the following:

I wherein

R" is any mono- or polyfunctional organic radical;

R is H or $CH_3$;

R' is H or $—C(O)C(R)=CH_2$, with the proviso that $—C(O)C(R)=CH_2$ occurs at least once;

x is an integer 0–4 and indicates the number of functional groups on R" which are reactive with ethylene or propylene oxide;

z is an integer 1–4 and may vary independently of x and n;

n is an integer 1–20 and is independent of x and z; and wherein if any of R, R', or R" are greater than one, their identities and the number of each may be the same or different; and:

II wherein

R" is any mono- or polyfunctional organic radical;

R is H or $CH_3$;

R' is H or $-C(O)C(R)=CH_2$, with the proviso that $-C(O)C(R)=CH_2$ occurs at least once;

x is an integer 0–4 and indicates the number of functional groups on R" which are reactive with ethylene or propylene oxide;

z is an integer 1–4 and may vary independently of x and n;

n is an integer 1–20 and is independent of x and z; and

R'" is H or a group of the formula:

wherein R, R', and n are as defined as above, wherein if any of R, R', R" or R'" are greater than one, their identities and the number of each may be the same or different.

As used herein, the term "any organic radical" refers to any organic radical which can be attached to a hydroxyl, primary amine or secondary amine. Typical examples include mono- or multifunctional aromatic or aliphatic functionalities, wherein the aliphatic functionalities may be unsaturated, saturated, straight, branched, or cyclic in configuration.

These agents may be used either alone, that is, as individual compounds selected from either Formula I or Formula II, in the transparentizing material. Alternatively, these agents may be used as in the transparentizing material as mixtures of compounds of Formula I, mixtures of compounds of Formula II, or as mixtures of a compound or mixture of compounds of Formula I and a compound or mixture of compounds of Formula II.

Compounds of Formula I and II are commercially available or may be prepared by procedures and techniques well known to one of ordinary skill in the art. For Example, compounds of Formula I may be prepared essentially as shown in Scheme A wherein all substituents are as previously defined unless otherwise specified.

SCHEME A

Compounds of Formula I may be prepared by techniques and procedures well known to one of ordinary skill in the art. For example, in Scheme A, step a, a polyhydric alcohol of formula 1 is reacted with an excess of an oxide of formula 2 to give a polyhydroxy polyether of formula 3. In step b, at least one of the hydroxy functionalities of the polyhydroxy polyether of formula 3 is esterified with acryloyl chloride or methacryloyl chloride to give the compounds of Formula I. Although depicted in Scheme A as complete esterification of all hydroxy functionalities of compounds of formula 3, it is understood that by varying the proportion of reagents, reactions times, and reaction temperatures, that some hydroxy functionalities of the compounds of formula 3 will not be esterified. Representative examples of compounds of Formula I are polypropylene glycol monoacrylate, ethoxylated trimethyolpropane triacrylate, and propoxylated neopentyl glycol diacrylate.

Compounds of Formula II may be prepared essentially as in Scheme B wherein all substituents are as previously defined unless otherwise specified.

SCHEME B

-continued

The compounds of Formula II may also be prepared by techniques and procedures well known to one of ordinary skill in the art. For example, in Scheme B, step a and step b, a polyhydric amine of formula 4 is reacted with an excess of an oxide of formula 2. Depending upon the proportion of reagents, reaction times, and reaction temperatures, the reaction of step a may result either in the formation of the secondary polyamine polyether of formula 5 as shown in step a or the tertiary polyamine polyether of formula 6 as shown in step b. Alternatively, the tertiary polyamine polyether of formula 6 may be formed from the reaction of the secondary polyamine polyether of formula 5 with excess oxide of formula 2. In step d, at least one hydroxy functionality of the tertiary polyamine polyether of formula 6 is esterified with acryloyl chloride or methacryloyl chloride to give the tertiary polyamine compounds of Formula II. Similarly, in step e, at least one of the hydroxy functionalities of the secondary polyamine polyether of formula 5 is esterified with acryloyl chloride or methacryloyl chloride to give the secondary polyamine compounds of Formula II. Although depicted in Scheme B as complete esterification of all hydroxy functionalities of compounds of formula 5 and 6, it is understood that by varying the proportion of reagents, reactions times and reaction temperatures, that some hydroxy functionalities of the compounds of formula 5 and 6 will not be esterified.

In Scheme A and B, all starting materials and reagents are commercially available or readily available to one of ordinary skill in the art.

When one or more of the monomers of Formula I and/or Formula II, without oligomers or prepolymers, are included in a radiation curable transparetization material, the liquid coating penetrates a cellulosic substrate quite rapidly and can be applied as a "100% solids" and still achieve a rapid rate of penetration. "100% solids" means a liquid material which can be coverted 100% to a solid upon curing (i.e., crosslinking or polymerization). Thus, it contains no residual volatiles or solvents. However, if even faster penetration is desired, a polar organic solvent can be added to the coating to lower the viscosity thereof. Preferred solvents are solvents which are polar and miscible with water and include methanol, ethanol, isopropanol, acetone and the like.

In the preferred embodiment, the radiation curable transparentizing material includes small amounts of water. Typically, in this embodiment, water constitutes from about 1–15% and preferrably from about 5–10% by weight of the final composition. As stated previously, unlike most transparentizing agents which are non-polar and therefore not soluble in water, the transparentizing agents of Formula I and Formula II form miscible mixtures with small amounts of water. Prior to exposure to radiation, the water is removed by evaporation with heat at a temperature sufficient to remove water. As one of ordinary skill in the art would realize, the faster the line speed, the higher the temperature required to remove the water. Typically, temperatures at or above 120° C. are utilized with higher line speeds, such as those at or above 500 linear feet per minute.

Preferably, the polymerizable transparentizing composition is cured by exposure to radiation-either electron beam, visible, or ultraviolet radiation. Curing causes the polymerizable constituents of the transparentizing composition to polymerize, thus making a permanently transparentized portion. Once the transparentizing material is cured, it is a solid and will not migrate or volatilize. Advantegeously, the rapidity with which the present transparentizing material penetrates the substrate allows curing thereof almost immediately following its application to the substrate, thus providing substantially no opportunity for the material to migrate or volatilize beyond the area to which it has been applied.

If electron beam curing is employed, no photocatalyst is needed. However, if curing it carried out by exposing the transparentizing material to ultraviolet radiation, a photocatalyst needs to be included. Preferably, the photocatalyst is of the free radical type. A wide variety of such photocatalysts can be used provided they do not deleteriously affect the desired physical and chemical properties of the resultant transparentized portion. Examples of useful free radical photocatalysts include an alkyl benzoin ether, such as benzoin ether benzophenone, a benzophenone with an amine such as methyl diethanolaminedimethylquinoxiline 4,4' bis (dimethylamine bezophenone), and acetophenones such as 2,2 diethoxyacetophenone and t-butyl trichloroacetophenone. A preferred class of useful free radical photocatalysts are haloalkyl substituted aryl ketone compounds. All such photocatalysts, useful in the practice of this invention, are either readily available commercially or are easily prepared using known techniques. Typically, when a photocatalyst is used, it will constitute approximately 1–15% by weight of the composition.

The speed at which the transparentizing material of the present invention penetrates substrate 12 allows transparentizing to occur in a continuous, in-line process. Such a process can include any conventional printing method such as flexographic, gravure, or screen. A continuous transparentization process can be set up in which the transparentizing material is first applied to area 24 in a flexographic printing press and then cured immediately thereafter by electron beam, visible, or ultraviolet radiation.

In the case of a flexographic printing press in combination with ultraviolet curing, for example, an acceptable rate of transparentization (i.e., applying the transparentizing material to substrate 12, evaporating water if necessary, and curing it) is from about 75 to about 150 linear feet Ii.e., about 22.9 meters to about 45.72 meters) of substrate per minute. Obviously faster production speeds are usually preferred. One expedient for increasing production speed is to mildly heat the substrate and/or transparentizing material (50° C.–100° C.) to effectively reduce viscosity and increase the penetration rate. The preferred viscosity of the coating at 25° C. is from about 30 to about 100 centipoise and more preferably from about 30 to about 70 centipoise. The preferred wavelength of the ultraviolet curing light is from about 200 to about 400 nanometers, and the preferred ultraviolet curing light capacity is from about 300 to about 600 watts per inch of substrate width.

The transparentizing material can be applied ot one or both sides of substrate 12 at area 24. It is preferred, however, that it be applied simultaneously to both sides of area 24. Such simultaneous application provides even faster penetration of the transparentizing material into the substrate.

Advantageously, the use of one or more of the above-recited compounds of Formula I and Formula II, without oligomers or prepolymers, results in a transparentizing material which not only penetrates substrate 12 quickly, but also produces a transparentized portion 14 which meets all of the desired physical and chemical properties. Physically, transparentized portion 14 is strong, flexible and durable such that it will maintain its transparency when subjected to rough handling. In addition, transparentized portion 14 is highly receptive to inks and/or toners. An advantage of such good receptivity to inks and/or toners is that it allows a reverse image to be printed on the lower surface of the transparentized portion. This feature will be explained in greater detail below.

Chemically, the transparentized portion 14 has sufficient resistance to ultraviolet radiation that it does not lose its transparency over time. The transparentized portion meets U.S. Postal Service specifications for reflectance and PCR. This is believed possible due to the fact that the above-recited monomers achieve substantially complete penetration of substrate 12. Additionally, transparentized portion 14 has sufficient resistance to migration and/or volatilization of the radiation cured transparentizing material that it does not lose its transparency over time. Due to the rapid penetration of the transparentizing material into substrate 12, the transparentizing material can be cured almost immediately after it has been applied to area 24. Moreover, although compatible with polar organic solvents, the transparentizing material of the present invention does not require the use of organic solvents. Therefore, it is less volatile after curing than one containing an organic solvent, thus further reducing the tendency to migrate or volatilize.

It is preferred that the transparentizing material, once cured, have a refractive index as close as possible to that of substrate 12. This will ensure that the transparentized portion 14 will be sufficiently transparent. Most cellulosic substrates have a refractive index of around 1.5. Thus, the preferred refractive index of the cured coating is similarly around 1.5.

However, some cellulosic substrates have a refractive index which is greater than 1.5. With such substrates, it may be desirable to include one or more prepolymers with the transparentizing material in order to increase the refractive index of the cured transparentizing material to substantially match that of the substrate. Typically, 1.55 is the highest value that the refractive index of the cured transparentizing material will need to attain in this manner. The preferred prepolymers for this function include styrene-maleic anhydride, styrene-acrylic acid and, styrene-methacrylic acid. The most preferred prepolymer of this group is styrene-maleic anhydride.

It may also be desirable in certain situations to have a transparentized portion with extra flexibility. For this purpose, an oligomer may be included with the transparentizing material. The preferred oligomers in this instance are urethane acrylate oligomer and styrene-acrylic oligomer.

Further, an amine may be included with the transparentizing material in order to reduce the curing time thereof. The preferred amine for this purpose is triethanol amine. Alternatively, compounds of Formula II may also be used for this purpose. Typically, when an amine is included in the transparentizing material for this purpose, it will constitute approximately 1–7% by weight of the composition.

Still further, a vinyl ether may be included with the transparentizing material to decrease odor. The preferred vinyl ether for this function is vinyl pyrrolidone. When included, a vinyl ether typically will constitute about 5% by weight of the final transparentizing material. It should be noted however, that the use of vinyl ethers is not compatible with the embodiment which includes small amounts of water.

Still further, acrylate or methacrylate esters of polyhydric alcohols which contain 4 or more acrylate or methacrylate functionalities may be added to the transparentizing material to increase the cross-linking density, lower the viscosity, and to generally increase the rate of curing of the transparentizing material. The preferred acrylates or methacrylates esters for this purpose are pentaerythritol tetramethacrylate, dipentaerythritol pentacrylate, and dipentaerythritol deshydroxymethyl pentacrylate. When included, an acrylates or methacrylates esters of this type will typically will constitute from about 1–10% by weight of the final transparentizing material.

Figure 5:
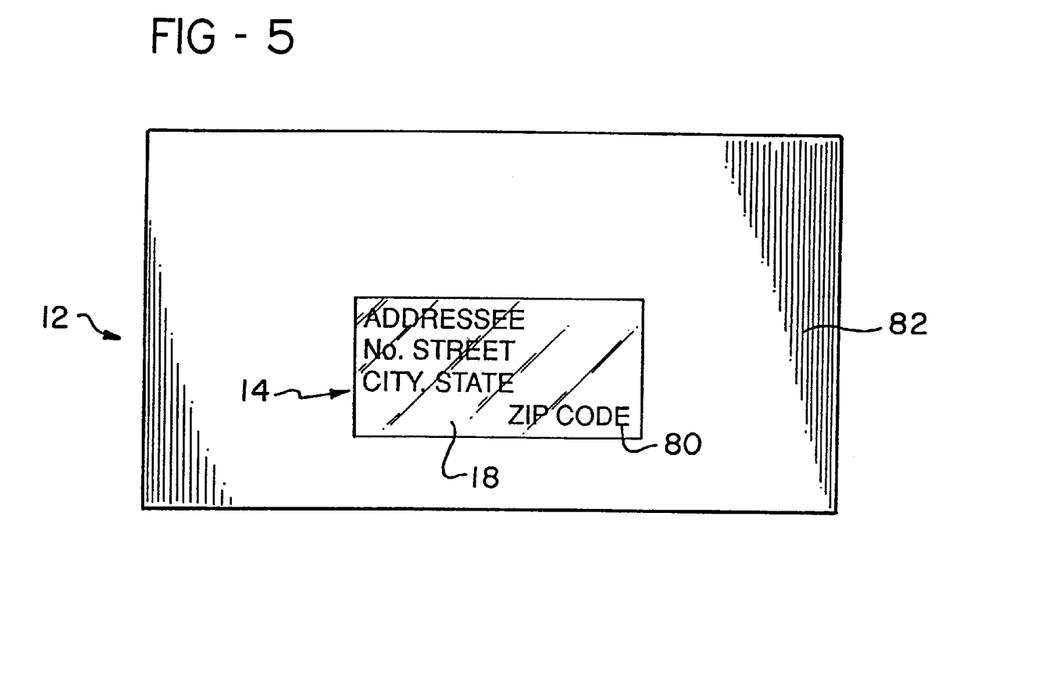
FIG. 5 is a front-elevational view of the cellulosic substrate of FIG. 3 or FIG. 4 in which a reverse image is printed on the lower surface of the transparentized portion.
Figure 6:
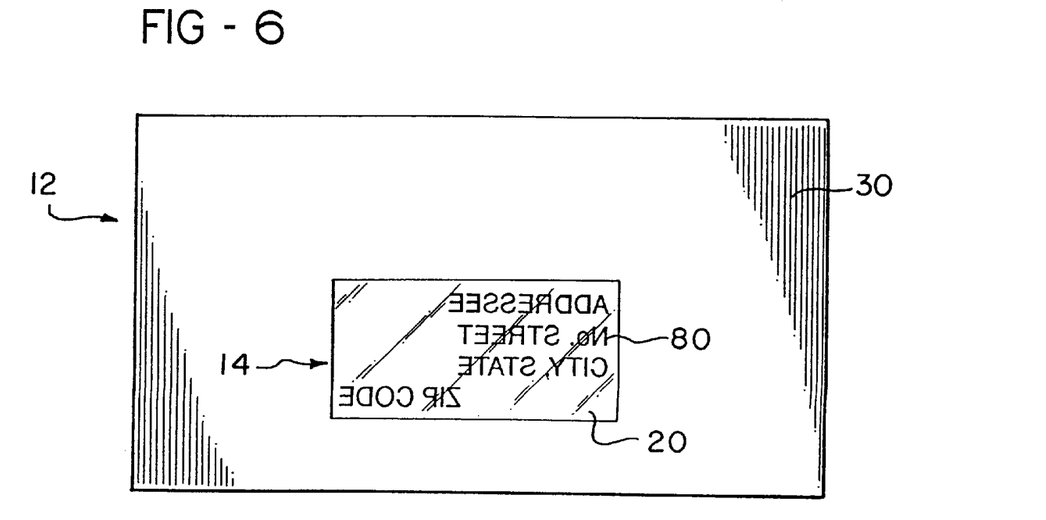
FIG. 6 is a rear view of the lower surface of the cellulosic substrate shown in FIG. 5.

Referring now to FIGS. 5 and 6, the reverse image printing feature of the present invention will be discussed. FIG. 6 is a view of the lower surface 30 of substrate 12 and shows reverse image 80, which has been printed on the lower surface 20 of transparentized portion 14. Reverse image 80 can be printed with any conventional printing means, such as laser printing, ion deposition printing, ink jet printing, or thermal transfer techniques. FIG. 5 is a view from the upper surface 82 of substrate 12 and shows reverse image 80 as it appears through the upper surface 18 of transparentized portion 14—i.e., as a normal image. When substrate 12 is used to form a mailer, the normal image of reverse image 80 is the image that will be seen by the observer.

In order that the invention may be more readily understood, reference is made to the following examples, which are intended to be illustrative of the invention but are not intended to be limiting in scope.

EXAMPLE 1

A radiation curable liquid transparentizing material was prepared in accordance with the present invention by blending the materials listed below. The liquid was then applied to a substrate by flexographic printing and cured by ultraviolet radiation at a wavelength of from about 200 to about 400 nanometers.

| A radiation curable transparentizing liquid was prepared as in Example 1 using the following materials: | |
|---|---|
| | Percent by weight |
| Polypropylene glycol monoacrylate[1] | 60.5 |
| Water | 6.2 |
| Ethoxylated trimethyolpropanetriacrylate[2] | 22.8 |
| Triethanolamine | 2.9 |
| Photocatalyst[3] | 7.6% |

[1]SR-604 from Sartomer
[2]SR-415 from Sartomer
[3]Iracure 1173 from Ciba Geigy

EXAMPLE 2

| A radiation curable transparentizing liquid was prepared as in Example 1 using the following materials: | |
|---|---|
| | Percent by weight |
| Polypropylene glycol monoacrylate[1] | 17.5 |
| Water | 6.2 |
| Ethoxylated trimethyolpropanetriacrylate[2] | 65.8 |
| Triethanolamine | 2.9 |
| Photocatalyst[3] | 7.6% |

[1]SR-604 from Sartomer
[2]SR-415 from Sartomer
[3]Iracure 1173 from Ciba Geigy

EXAMPLE 3

| A radiation curable transparentizing liquid was prepared as in Example 1 using the following materials: | |
|---|---|
| | Percent by weight |
| Propoxylated Neopentyl glycol diacrylate[1] | 66.7 |
| Ethoxylated trimethyolpropanetriacrylate[2] | 20.5 |
| Dipentaerythritol pentacrylate[3] | 3.1 |
| Triethanolamine | 2.9 |
| Photocatalyst[4] | 6.8% |

[1]SR-9003 from Sartomer
[2]SR-415 from Sartomer
[3]SR-9041 from Sartomer
[4]Iracure 500 or 1173 from Ciba Geigy

EXAMPLE 4

| A radiation curable transparentizing liquid was prepared as in Example 1 using the following materials: | |
|---|---|
| | Percent by weight |
| Propoxylated Neopentyl glycol diacrylate[1] | 66.7 |
| Ethoxylated trimethyolpropanetriacrylate[2] | 20.5 |
| Dipentaerythritol pentacrylate[3] | 3.1 |
| Photocatalyst[4] | 9.7 |

[1]SR-9003 from Sartomer
[2]SR-415 from Sartomer
[3]SR-9041 from Sartomer
[4]Iracure 500 or 1173 from Ciba Geigy

While representative embodiments and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of transparentizing a cellulosic substrate which comprises;

a) providing a cellulosic substrate;

b) applying to a surface of the substrate a composition which includes at least one compound selected from compounds of the formula:

wherein

R" is any mono- or polyfunctional organic radical;

R is H or $CH_3$;

R' is H or $-C(O)C(R)=CH_2$, with the proviso that $-C(O)C(R)=CH_2$ occurs at least once;

x is an integer 0–4 and indicates the number of functional groups on R" which are reactive with ethylene or propylene oxide;

z is an integer 1–4 and may vary independently of x and n;

n is an integer 1–20 and is independent of x and z; and wherein if any of R, R', or R" are greater than one, their identities and the number of each may be the same or different; or wherein R" is any mono- or polyfunctional organic radical;

R is H or $CH_3$;

R' is H or $-C(O)C(R)=CH_2$, with the proviso that $-C(O)C(R)=CH_2$ occurs at least once;

x is an integer 0–4 and indicates the number of functional groups on R" which are reactive with ethylene or propylene oxide;

z is an integer 1–4 and may vary independently of x and n;

n is an integer 1–20 and is independent of x and z; and R'" is H or a group of the formula:

wherein R, R', and n are as defined as above,
wherein if any of R, R', R" or R'" are greater than one, their identities and the number of each may be the same or different; and c) curing the composition with radiation.

2. The method of claim 1 wherein the composition is applied to the substrate as a 100% solids liquid.

3. The method of claim 1 wherein the composition further includes a prepolymer or oligomer.

4. The method of claim 3 wherein the prepolymer is selected from styrene-maleic anhydride prepolymer, styrene-acrylic acid prepolymer, or styrene-methacrylic acid prepolymer.

5. The method of claim 3 wherein the oligomer is selected from styrene-acrylic acid oligomer or urethane acrylate oligomer.

6. The method of claim 1 wherein the composition further includes one or more acrylate or methacrylate esters of a polyhydric alcohols which contain 4 or more acrylate or methacrylate functionalities.

7. The method of claim 6 wherein the acrylate or methacrylate esters are selected from pentaerythritol tetramethacrylate, dipentaerythritol pentacrylate, or dipentaerythritol deshydroxymethyl pentacrylate.

8. The method of claim 1 wherein the composition further includes 1–15% by weight of water.

9. The method of claim 8 further including a photocatalyst.

10. The method of claim 9 wherein the composition comprises approximately 75–95% by weight of at least one compound selected from Formula I or II as defined by claim 1; approximately 1–15% by weight water; approximately 1–7% by weight of an amine; and approximately 1–15% by weight photocatalyst.

11. The method of claim 10 wherein the composition comprises approximately 60% by weight polypropylene glycol acrylate; approximately 6% by weight water; approximately 23% by weight ethoxylated trimethyolpropanetriacrylate; approximately 3% by weight triethanolamine; and approximately 8% by weight photocatalyst.

12. The method of claim 10 wherein the composition comprises approximately 17% by weight polypropylene glycol acrylate; approximately 6% by weight water; approximately 66% by weight ethoxylated trimethyolpropanetriacrylate; approximately 3% by weight triethanolamine; and approximately 8% by weight photocatalyst.

13. The method of claim 1 wherein the composition comprises at least one compound or selected from Formula I or II as defined by claim 1; one or more acrylate or methacrylate esters of polyhydric alcohols which contain 4 or more acrylate or methacrylate functionalities; an amine; and a photocatalyst.

14. The method of claim 13 wherein the composition comprises approximately 75–95% by weight at least one compound selected from Formula I or II as defined by claim 1; approximately 1–10% by weight of one or more acrylate or methacrylate esters of polyhydric alcohols which contain 4 or more acrylate or methacrylate functionalities; approximately 1–7% by weight of an amine; and approximately 1–15% by weight photocatalyst.

15. The method of claim 14 wherein the composition comprises approximately 67% by weight propoxylated neopentyl glycol diacrylate; approximately 20% by weight ethoxylated trimethylol propane triacrylate; approximately 3% by weight dipentaerythritol pentacrylate; approximately 3% by weight triethanolamine; and approximately 7% by weight photocatalyst.

16. The method of claim 1 wherein the composition comprises at least one compound selected from Formula I or II as defined by claim 1; one or more acrylate or methacrylate esters of polyhydric alcohols which contain 4 or more acrylate or methacrylate functionalities; and a photocatalyst.

17. The method of claim 16 wherein the composition comprises approximately 75–95% by weight of at least one compound selected from Formula I or II as defined by claim 1; approximately 1–10% by weight of one or more acrylate or methacrylate esters of polyhydric alcohols which contain 4 or more acrylate or methacrylate functionalities; and 1–15% photocatalyst.

18. The method of claim 17 wherein the composition comprises approximately 67% by weight propoxylated neopentyl glycol diacrylate; approximately 20% by weight ethoxylated trimethylol propane triacrylate; approximately 3% by weight dipentaerythritol pentacrylate; and approximately 10% photocatalyst.

19. The method of claim 1 wherein the composition has a refractive index of about 1.5 when cured.

20. The method of claim 1 wherein the transparentized portion has a thickness in the range of from about 0.0005 to about 0.002 inches.

21. The method of claim 1 wherein the substrate is in the form of an envelope or mailer having at least a first ply and a second ply, with the transparentized portion on the first ply.

22. A cellulosic substrate suitable for use as an envelope or mailer and having at least one transparentized portion, said transparentized portion comprising an area of said substrate which has been impregnated with a polymerizable transparentizing material comprising at least one compound selected from Formula I or II as defined by claim 1.

23. A cellulosic substrate suitable having at least one transparentized portion, said transparentized portion comprising an area of said substrate which has been impregnated with a polymerizable transparentizing material comprising at least one compound selected from Formula I or II as defined by claim 1.

* * * * *